United States Patent Office 3,090,964
Patented May 28, 1963

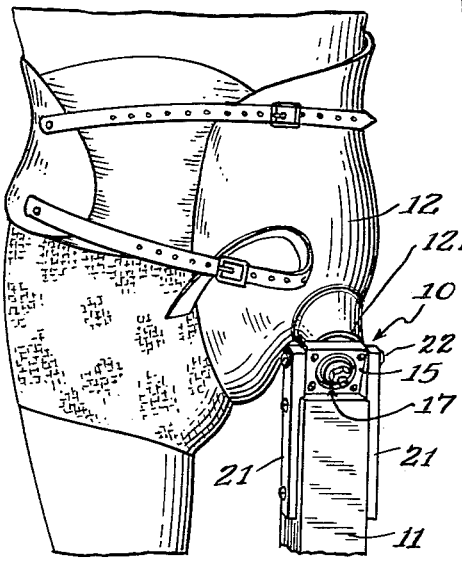
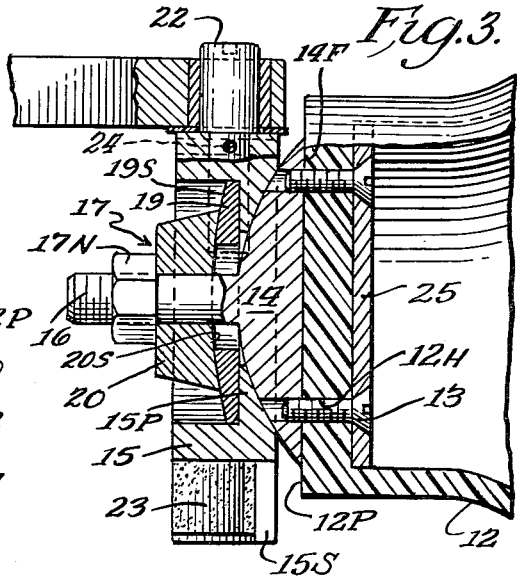
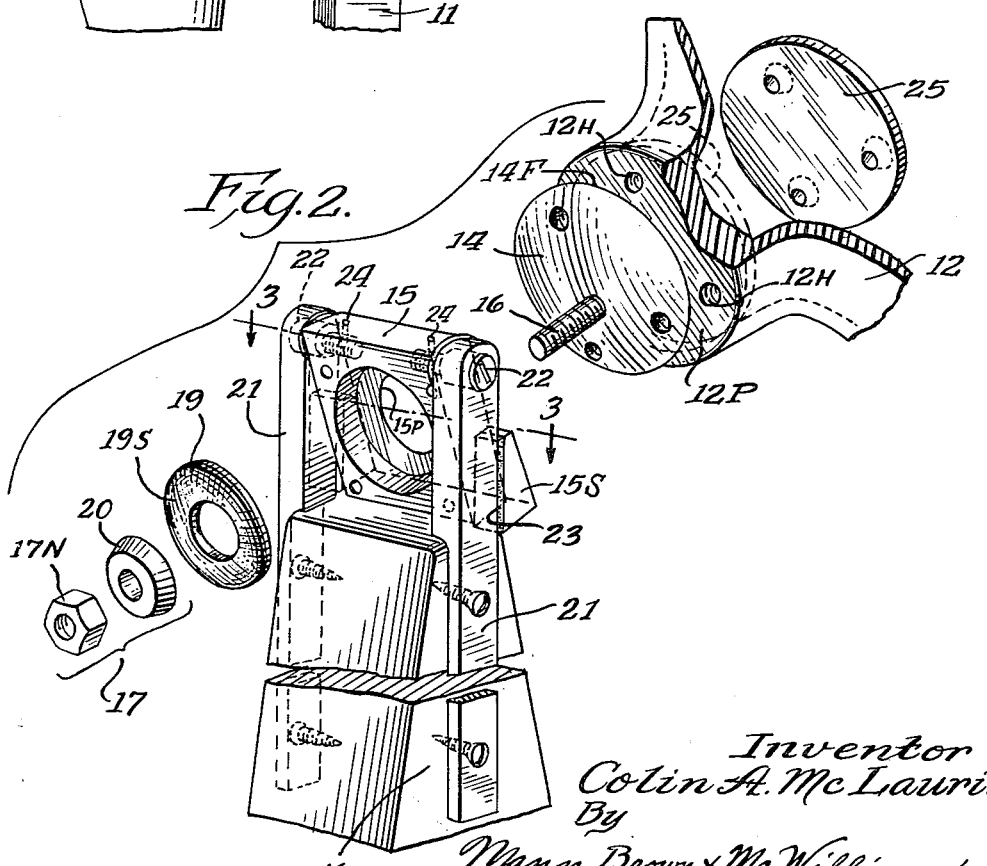

3,090,964
HIP JOINT
Colin A. McLaurin, Cary, Ill., assignor to Northwestern University, a corporation of Illinois
Filed Feb. 15, 1962, Ser. No. 173,468
7 Claims. (Cl. 3—15)

This invention relates to an artificial hip joint for use in articulating the thigh section of a prosthesis to a pelvic socket and more particularly is concerned with an improved adjustable hip joint for facilitating dynamic alignment of the prosthesis.

It has not previously been possible to make alignment adjustments of the prior art hip joints after they were attached to the socket and due to the preciseness of adjustment that is required, it has been extremely difficult to provide a proper fit suitable to the needs of each patient.

In the prior art it has been customary to build extension stops directly on to the socket and this has proven to be a tedious and time consuming procedure and results in a structure that is not inherently strong. Moreover, the requirement of custom fitting the hip joint to the exact need of each patient adds to the difficulties of this prior art approach.

The principal object of the present invention is the provision of an adjustable hip joint for accommodating dynamic alignment.

Another object of the invention is the provision of a hip joint that affords universal spherical adjustment as this single mode of adjustment fulfills the requirements for dynamic alignment.

Still another object of the invention is the provision of a hip joint incorporating positive extension stops as a part of the joint structure for providing better control over hip extension.

Another object of the invention is the provision of an adjustable hip joint having its thigh attachment elements readily separable from their axle block to permit of removing the thigh section for final finishing operations without loss of the previously determined dynamic alignment adjustment of the hip joint.

Other objects and advantages will become apparent during the course of the following description.

In the accompanying drawings forming a part of this specification and in which like numerals are employed to designate like parts throughout the same:

FIG. 1 is a perspective view illustrating the hip joint of this invention applied in articulating relation between the thigh section of a prosthesis and a pelvic socket;

FIG. 2 is an exploded perspective view illustrating the parts of the hip joint; and FIG. 3 is an enlarged sectional view through the hip joint illustrating the parts in their assembled mounted relation.

Referring now to the drawings, the hip joint designated generally as 10, is shown applied to a patient in FIG. 1 for articulating the proximal end of a thigh section 11 of a prosthesis, to a pelvic socket 12. In the practice of this invention, the pelvic socket 12 is preferably provided with a built up flat surfaced hip platform 12P lying in a plane normal to the sagittal plane and oriented at 45° to the horizontal. This is accomplished by forming a plaster wrap directly to the pelvic region of the patient and thereafter pouring a positive plaster cast to the shape of the wrap, with the cast having embedded therein, an accurately oriented guide or holding rod for establishing and maintaining an initial reference relationship determined by properly positioning the patient during application of the plaster wrap.

The plastic socket 12 is formed directly to the plaster cast and is formed of reinforced plastic laminate applied upon the cast by either a vacuum or hand lay up technique. The socket 12 is formed so that the platform region 12P is approximately at the highest point of the curved junction of the anterior wall and the seat of the socket, at least 1 inch from the medial edge of this area. The built up region at the platform should have a finished thickness of about 5/16" and should provide a flat surface projecting about 1/8 to 1/4" beyond adjacent regions of the socket to allow clearance of the hip joint 10. Three equiangularly spaced holes 12H are drilled through the platform to receive attachment screws 13 for the hip joint.

The hip joint 10 includes a spherical segment 14 having a flat attachment face 14F for securement to the flat surfaced socket platform 12P, and an axle block 15 having a central through passage bordered by an annularly extending proximal seat portion 15P carried integrally on the block and providing a concave spherical surface matched to the segment contour to provide a circular line contact therewith. The spherical segment 14 is provided with a rigid shank 16 projecting therethrough on a radius line for the segment and arranged to be disposed in the through passage of the axle block 15 with adequate side clearance to accommodate a range of universal spherical adjustment between the block and segment. The shank 16 receives releasable clamping facilities 17 that are arranged to lock the segment in any selected position of spherical adjustment relative to the block and this single step universal adjustment arrangement facilitates dynamic alignment of the hip joint.

In the preferred arrangement illustrated herein for purposes of disclosure the axle block 15 is provided with a convex seat 19S bordering and encircling the through passage and having a convex spherical form curved about the same center as the spherical segment. Preferably, this seat 19S is provided on a separate annular insert segment 19 fitted snugly within the block so as to remain stationary during all normal adjustment operations. The insert extends radially inwardly of the proximal seat 15P to present an annular abutment shoulder that limits the amount of side clearance available for accommodating spherical adjustment of the shank with respect to the block.

The clamping facilities 17 include a washer 20 of frustoconical form having a concave conical seat surface 20S that has a circular line contact with the inner seat 19S provided on the insert 20. A hex-nut 17N is threaded on the free end of the shank for clamping all of the parts together under tight axial compression. This simple single step adjustment permits repeated dynamic alignment settings of the hip joint as necessary for precise fitting to the needs of the patient and the clamping action is adequate for securing the parts in fixed relation at each selected position of adjustment pending final positive interlocking after the adjustment has been determined to be proper.

In the preferred form, all of the spherical surfaces have the same center of curvature and adjacent contacting spherical surfaces have the same radius of curvature to create a circular line contact between the parts at all positions of adjustment. The conical surfaces in each case could be spherical if desired.

It may occur at times that the range of adjustment made possible by the side clearance afforded between the shank 16 and the axle block 15 is insufficient to satisfy adjustments required during dynamic alignment of the hip joint 10. Coarse adjustment of the initial shank position is, therefore, provided by disposing the shank on a radius line that is eccentric to an axis of symmetry of the spherical segment 14 so that the reference position of the shank may be varied by rotation of the spherical segment with respect to its mounting platform 12P. The equiangular spacing arrangement of the holes 12H in the platform and in the spherical segment allow for rotation of the segment in increments of 120°. Obviously, other hole spacings may be employed where other increments of rotary adjustment of the shank position are desired.

The axle block 15 carries rigid side straps 21 pivoted on axles 22 that project from opposite ends of the block. These side straps, as is conventional, may have spaced openings to facilitate bolting to the thigh section 11. In accordance with this invention, the axle block 15 is also equipped with integrally formed endwise projections 15S underlying the axles 22 to act as positive stops for limiting the permissible swing of the side straps 21 and thereby controlling hip extension. Resilient cushions or pads 23 are adhered to the stops 15S to quiet the action of these parts during use of the hip joint. The axles 22 which carry the side straps 21 are removably secured in the axle block 15 and in the arrangement disclosed herein the axles are threaded into tapped sockets provided in the block and secured against dislodgement by set screws 24. When the side straps 21 are affixed to the thigh section 11, they can only be removed from the axle block 15 by removing the axles 22. This arrangement provides a positive lock during use of the hip joint 10 but facilitates ready removal of the side straps 21 to permit separation of the thigh section, without loss of adjustment, for final finishing operations.

In the application of the present invention, the spherical segment 14 is fixed to the plastic socket 12 and for this purpose the segment is anchored to a mounting disc 25 that is located within the socket in backing relation to the platform 12P, with a set of attachment screws 13 fixing the segment 14, the mounting disc 24 and the plastic socket 12 in tightly assembled relation. The axle block 15 is then adjustably positioned on the segment 14 with appropriate changes being made as the need is indicated for them by walking trials of the patient. When proper dynamic alignment is achieved the clamping facilities are tightened and finally locked in place. Preferably, holes are drilled in registering relation through the axle block 15 and segment 14 and dowels (not shown) are driven thereinto to secure the parts against any accidental displacement.

It should be understood that the description of the preferred form of the invention is for the purpose of complying with Section 112, Title 35, of the U.S. Code and that the claims should be construed as broadly as prior art will permit.

What is claimed is:

1. In combination, a pelvic socket, an artificial thigh section, and a hip socket for articulating the thigh section to the pelvic socket, said pelvic socket having an upraised flat surface platform portion and said hip joint comprising a spherical segment having a flat surfaced attachment face for engagement to the platform portion, a mounting disc for said segment disposed within the socket in backing relation to said segment, attachment facilities engageable between said segment and disc to fix the position of said segment on said platform, said segment having an exposed face of convex spherical form intercepted by a fixed shank carried by said segment, an axle block having a central throughpassage bordered by a proximal seat having a face of corresponding concave form to engage said exposed segment face in spherically adjustable relation and to dispose said shank in said throughpassage with adequate side clearance to accommodate such spherical adjustment, and releasable clamping facilities on said shank and engageable with said block to fix the segment and block in any selected position of relative spherical adjustment.

2. The combination of claim 1 wherein said shank is located on a radius of said spherical segment that is eccentric to a line of symmetry therethrough and wherein said segment, said mounting disc and said platform have corresponding equiangularly spaced holes for engagement by said attachment facilities for accommodating relative rotary adjustment of said spherical segment.

3. In combination, a pelvic socket having an attachment face, a thigh section, and a hip joint connected between said pelvic socket and said thigh section and comprising a spherical segment having an attachment face secured to the attachment face of said pelvic socket and having an exposed face of convex spherical form intercepted by a fixed shank carried by said segment, an axle block having a central throughpassage bordered by a proximal seat having a face of corresponding concave form to engage said exposed segment face in spherically adjustable relation and to dispose said shank in said throughpassage with adequate side clearance to accommodate such spherical adjustment, releasable clamping facilities on said shank and engageable with said block to fix the segment and block in any selected position of relative spherical adjustment, said axle block having axles projecting laterally from opposite ends thereof and equipped with pivotally mounted rigid side straps that fixedly engage said thigh section, and said axle block having rigid abutments projecting laterally from said opposite ends thereof and disposed beneath said axles to function as extension stops for said side straps.

4. In combination, a pelvic socket having an attachment face, a thigh section, and a hip joint connected between said pelvic socket and said thigh section and comprising a spherical segment having an attachment face secured to the attachment face of said pelvic socket and having an exposed face of convex spherical form intercepted by a fixed shank carried by said segment, an axle block having a central throughpassage bordered by oppositely directed proximal and outer seat faces, said proximal seat face being of concave form to engage said exposed segment face in spherically adjustable relation and to dispose said shank in said throughpassage with adequate side clearance to accommodate such adjustment, and said outer seat face being of convex spherical form, a washer on said shank and having a contact face of concave form matched to and engageable with said outer seat face, and a nut in threaded relation on said shank to clamp said washer, said block and said segment in any selected position of spherical adjustment, said axle block having axles projecting laterally from oposite ends thereof and equipped with pivotally mounted rigid side straps that fixedly engage said thigh section, and said axle block having rigid abutments projecting laterally from said opposite ends thereof and disposed beneath said axles to function as extension stops for said side straps.

5. In combination, a pelvic socket having an attachment face, a thigh section, and a hip joint connected between said pelvic socket and said thigh section and comprising a spherical segment having an attachment face secured to the attachment face of said pelvic socket and having an exposed face of convex spherical form intercepted by a fixed shank carried by said segment, an axle block having a central throughpassage bordered by a proximal seat having a face of corresponding concave form to engage said exposed segment face in spherically adjustable relation and to dispose said shank in said throughpassage with adequate side clearance to accommodate such spherical adjustment, releaseable clamping facilities on said shank and engageable with said block to fix the segment and block in any selected position of relative spherical adjustment, rigid side straps fixed to said thigh section, and releasable means pivotally mounting said side straps to said axle block.

6. In combination, a pelvic socket havng an attachment face, a thigh section, and a hip joint connected between said pelvic socket and said thigh section and comprising a fixed element having an attachment face secured against the attachment face of said socket and having a shank projecting away from said attachment faces, an axle block engaged against said element in a concave-convex relationship thereto to enable engagement therebetween at various different positions of rotary adjustment, said axle block having a throughpassage receiving said shank with side clearance to accommodate such adjustment, releasable clamping facilities on said shank and engageable with said block to fix the block and element in any selected position of adjustment, said block having endwise removable axles projecting laterally from oposite ends thereof, releasable means retaining said axles against accidental removal, and rigid side straps fixedly secured to said thigh section and pivoted on said axles.

7. An arrangement in accordance with claim 6 wherein said axle block has rigid abutments projecting laterally from said opposite ends thereof and disposed beneath said axles to function as extension stops for said side straps.

References Cited in the file of this patent

UNITED STATES PATENTS

| | | |
|---|---|---|
| 1,446,164 | D'Eyraud | Feb. 20, 1923 |
| 2,465,565 | Agner | Mar. 29, 1949 |
| 3,034,810 | Primeau | May 15, 1962 |

OTHER REFERENCES

Orthopaedic Appliances Atlas, vol. 2, by J. W. Edwards, Ann Arbor, Michigan, 1960, pages 230–233. (Copy in Div. 55.)